United States Patent
Kubooka et al.

(10) Patent No.: US 7,191,443 B2
(45) Date of Patent: Mar. 13, 2007

(54) DIGITAL DEVICE, TASK MANAGEMENT METHOD AND PROGRAM THEREFOR

(75) Inventors: Yuko Kubooka, Hiroshima-ken (JP); Shigenori Doi, Hiroshima-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 775 days.

(21) Appl. No.: 10/050,988

(22) Filed: Jan. 22, 2002

(65) Prior Publication Data

US 2002/0099755 A1   Jul. 25, 2002

(30) Foreign Application Priority Data

Jan. 25, 2001   (JP) .............................. 2001-016601

(51) Int. Cl.
*G06F 9/46*   (2006.01)
*G06F 13/24*   (2006.01)

(52) U.S. Cl. ...................... 718/100; 719/318; 710/260; 710/262

(58) Field of Classification Search ........ 718/100–108; 710/260, 262; 719/318
See application file for complete search history.

(56) References Cited

U.S. PATENT DOCUMENTS 5,513,349 A   4/1996   Horiguchi et al.

6,253,225 B1 *   6/2001   Nakahara et al. ........... 718/100

FOREIGN PATENT DOCUMENTS

JP   10-069392   3/1998

* cited by examiner

*Primary Examiner*—Meng-Al T. An
*Assistant Examiner*—Jennifer N. To
(74) *Attorney, Agent, or Firm*—McDermott Will & Emery LLP

(57) ABSTRACT

A task management method is provided for preventing a task that can cause a failure in a system from being aborted during a manipulation of the task. A program execution means transmits information on an attribute of a function under execution, and queries about the execution of an abort for a task to which the function belongs. The task execution determination means determines whether the abort should be executed based on the attribute of the function under execution. A task attribute recognition means stores the attribute of the function under execution in a task attribute information storage means, and returns the stored attribute of the function in response to a query about the attribute of the function from the task execution determination means.

6 Claims, 7 Drawing Sheets

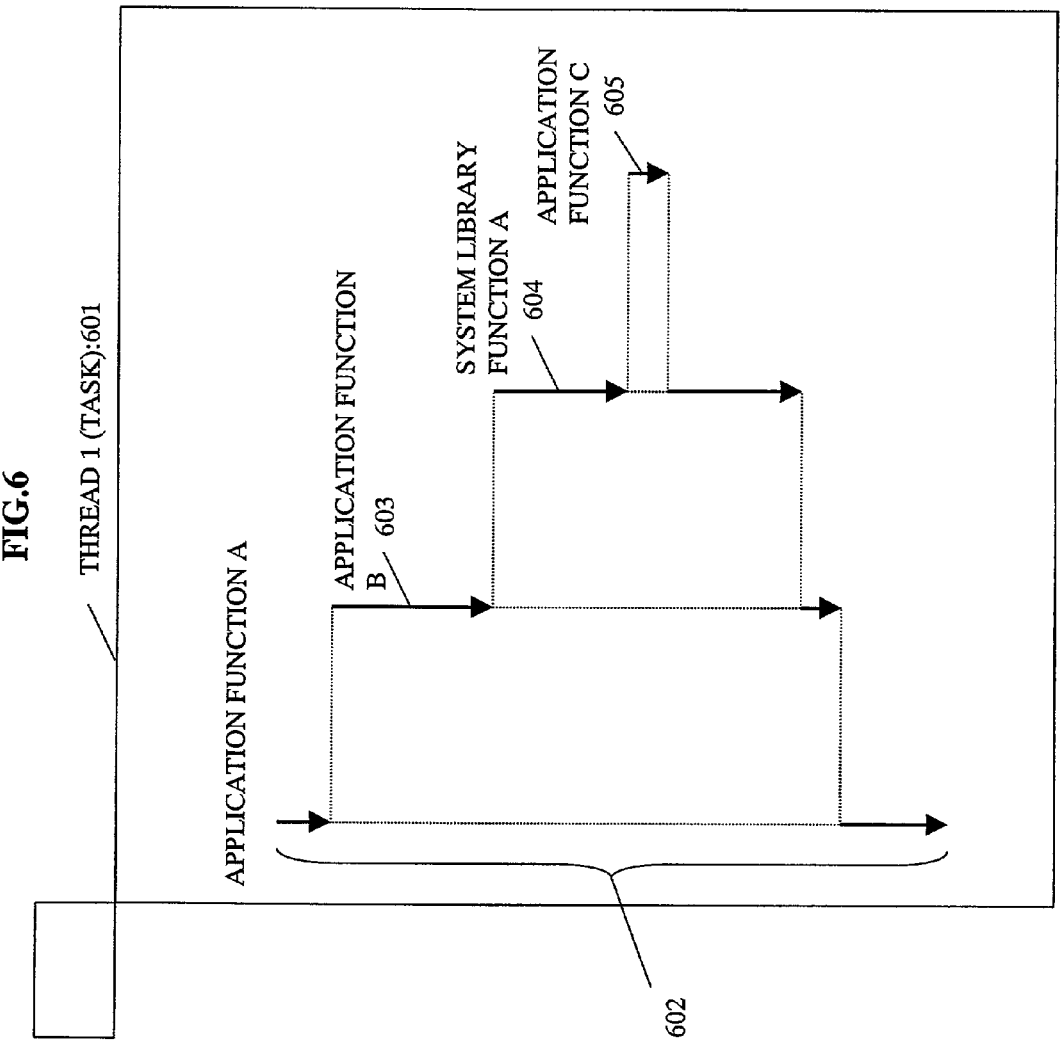

DIGITAL DEVICE, TASK MANAGEMENT METHOD AND PROGRAM THEREFOR

BACKGROUND OF THE INVENTION

1. Field of the Invention

The present invention relates to a digital device, a task management method and a program therefor, and more particularly, to a digital device and a task management method for managing abortion of a task in a multitask operating system, and a program for causing a computer to implement associated functions.

2. Description of the Related Art

Conventionally, when a variety of functions are implemented mainly using software, for example, in a set-top box (STB: a general designation for devices such as a control box of a cable television, which are connected to home-use televisions for providing additional functions), a portable telephone and the like, the software is provided in the form of so-called embedded operating system (OS) which has previously stored an OS and programs for implementing the respective functions. Manufacturers which provide products provided with the embedded OS can sufficiently verify the operation of each function in the embedded OS and debug in a variety of operating states, so that they can offer highly reliable products which are stable in operation.

In recent years, some products may have a shorter lifetime, and new functions are added/changed at a shorter cycle as well. Therefore, a general OS has been used more and more in place of the embedded OS in products for flexibly accommodating such addition/change of functions. Further, with the development (diversification) of networks as well as proliferation of multifunction interpreter languages suitable for the networks as represented by Java, downloading of a program associated with addition/change of functions becomes easier, which also constitutes a factor of promoting the transition from the embedded OS to the general OS.

In the following, a general form of task execution will be described when the general OS is used. Since the general OS as described above normally operates as a multitask OS, the following description includes the multitask OS as well.

As illustrated in FIG. 5A, in a multitask OS, a plurality of processes 1, 2 (502, 503), for example, are executed on an OS 501. A plurality of threads are also executed in such a manner that a thread 1 (504) and a thread 2 (505), for example, are executed under management of the process 1 (502), a thread 4 (506) is executed under management of the process 2 (503), and the like. Upon execution, the process 1 (502), for example, is allocated resources such as a memory space, an I/O (Input/Output) space and the like from the OS 501, and the allocated resources are shared by the thread 1 (504) and thread 2 (505).

The process used herein refers to one execution unit of a program. More specifically, the process is a unit which independently possesses the resources and the like, and ensures the independence of each execution unit upon switching (upon switching processes by a multitask OS) by preserving all contents of CPU registers and loading register values for a process which is executed next. The thread is also one execution unit of a program, which enables multitask processing within the same process. While the units such as the process and thread are treated in different manners depending on particular OS, they can be said to be essentially one execution unit of a program and a set of functions. Thus, while the process and thread are properly used in the following description as required, both are similar in that they are tasks and constitute one execution unit of a program. In addition, an application is also a task in a broad sense.

Next, the structure of the aforementioned task (process and thread) will be described in brief. Generally, the task is comprised of a set of functions, and is executed, for example, in such a procedure that a predetermined function passes arguments to another function which passes a return value calculated using the arguments again to the predetermined function which then executes subsequent processing using the return value. Describing with reference to FIG. 6, for example, a task (thread 1) 601 includes an application function a (602) developed by a user as a main routine (main function), and calls an application function b (603) while it is processing the main routine. The application function b (603) further reads a system library function a (604) which is provided as a system library function as required, and the system library function a (604) calls an application function c (605). The functions called in course of the processing pass back respective return values calculated using arguments which have been given upon calling, and a function called in response to each return value executes subsequent processing.

In the foregoing manner, a plurality of functions constituting a task are individually processed to complete the processing of a predetermined task (main routine). The application function used herein refers to a function created as required, for example, by a person who programmed the task, and the system library functions refer to previously provided basic functions and the like. The application function and system library functions are both comprised of several tens to several thousands of steps, by way of example.

Each of the aforementioned thread 1 (504) and thread 2 (505) is executed in a processing time sequentially allocated by the OS 501, as shown in FIG. 5B. Specifically, the OS 501 allocates processing times 507 to 510 to the thread 1 and thread 2 (assume herein that the processing of a thread 3 is out of consideration) by means of a timer. In this event, the thread 1 is executed, for example, when the processing time 507 is first allocated by the OS 501, and the thread 2 is executed in the subsequently allocated processing time 508. In this manner, a plurality of processes can be executed in parallel by sequentially giving processing times to a plurality of threads (tasks) by the OS. In other words, the multitask OS can be implemented. The switching of threads (tasks) is referred to as "dispatch."

The use of the general OS described above, the development (diversification) of networks, the proliferation of multifunction interpreter languages and the like enable flexible addition and the like of new functions to a variety of products.

After a modification of a system by addition and the like of new functions, a variety of use forms can be contemplated by combining the new functions. In such a situation, a large amount of resources are generally consumed, so that the resources cannot be allocated to programs which are to be executed later, thereby failing to initiate new programs. In order to avoid such a situation, conventionally, the task (process or thread) can issue, for example, an instruction for terminating the processing of another task, i.e., an abort instruction. The abort instruction can release resources so far allocated to a different task and initiate a new program. The lack of resources is more likely to occur in products which are limited in functions to some degree (for example, the aforementioned STB, portable telephone and the like), because such products are often provided with insufficient resources unlike general-purpose personal computers.

However, if one task is unreasonably permitted to abort the processing of another task, the other task may be aborted in the midst of important processing such as a data write. In order to address this problem, the technology described in Japanese Unexamined Patent Publication No. 10-69392 (1998) permits an "abort disabled section" to be set to a predetermined processing section to disable the abortion in the set processing section.

In the following, a mechanism of issuing an instruction for terminating the processing of a task, and the setting of the abort disabled section will be described with reference to FIG. 7.

Assume in FIG. 7 that a thread 1 (601) and a thread 2 (701) have been initiated as independent tasks on an OS. The thread 1 (601) and thread 2 (701) alternately execute the processing as appropriate through the aforementioned multitask processing. For example, as a processing time allocated to the thread 1 (601) expires, the thread 2 (701) next operates.

In this event, when the processing is switched to the thread 2 (701) at a time 702 at which a system library function a (604) is executed in the thread 1 (601), the thread 2 (701) executes the processing, for example, from an application function d (703).

Subsequently, suppose that at a predetermined point 705 during the processing on an application function e (704) in the thread 2 (701), the thread 2 (701) issues an abort instruction to the thread 1 (601), and the processing is switched to the thread 1 (601) at a predetermined point 706 in the application function d (703). In this event, the abort instruction is received, for example, during the execution of the system library function a (604) in the thread 1 (601), so that the thread 1 (601) is aborted, for example, by the OS during the execution of the system library function a (604) (immediately after the execution time 702). If the abortion of the processing by each of the functions (602 to 605) largely affects the overall processing, an abort disabled section is set in the following manner.

Specifically, at a predetermined point 707 of the application function a (602) in the thread 1 (601), the application function a (602) issues an abort disable instruction 708. The abort disable instruction is recognized and stored, for example, in predetermined processing in the OS. Next, as an abort disable instruction is issued by the thread 2 (701) at a predetermined point 705, similar to the foregoing, to switch the processing to the thread 1 (601), the OS, for example, determines whether or not the abort disable instruction has been issued. Since the abort disable instruction has been issued in this event, the abortion is not executed and normal processing is continued instead.

Subsequently, as the application function a (602) issues an abort enable instruction 710 at a predetermined point 709, the abort enable instruction is recognized, for example, in predetermined processing of the OS to conclude a section from the time when the abort disable instruction 708 was issued to the time when the abort enable instruction 710 is issued, i.e., the abort disabled section.

As the abort disabled section terminates, the OS, for example, reflects the abort instruction issued at the predetermined point 705 by the thread 2 (701) to abort the thread 1 (601) at the predetermined point 709 in the application function a (602).

By thus issuing the abort instruction between tasks (threads), it is possible to release resources used, for example, by another task. Moreover, when important processing (for example, a manipulation on a shared resource) which could affect the system is under execution, the important processing can be normally terminated by disabling the abortion from another task.

However, the aforementioned prior art, when used, will give rise to the following problems. If a program (software) including new functions, for example, is downloaded to a general OS using a network and executed on the general OS, the program may not normally operate, because of a wide variety of user environments, in contrast with the embedded OS, such as a plurality of different programs executed on respective devices. In such a case, the program must be aborted, but if the aforementioned abort disabled section has been set, the program cannot be aborted.

Particularly when a program created by a third party is downloaded through the Internet, the execution of the program may involve some risk because the program is not always created on a beneficial basis.

Specifically, if the thread 1 (601) shown in FIG. 7 is a malicious program, this program may execute an infinite loop, for example, in the application function b (603) to generate a thread having a similar application function b (603). In this event, if the malicious program is executed, threads will proliferate, and abort instructions to the threads will be invalidated by the setting of the abort disabled section. Eventually, a terminal (product) which has executed the program cannot be controlled by the OS, so that the terminal must be powered off.

Such a problem is not limited to products which use a general OS to provide particular functions but is likely to occur as well in Windows (R) and UNIX (R) which are common general-purpose OS.

SUMMARY OF THE INVENTION

The present invention has been proposed in view of the circumstance in the prior art, and it is an object of the invention to provide a task management method which disables an abort of a task that could cause a failure in a system if it is aborted, for example, during a manipulation of a shared resource.

In order to achieve the above object, the present invention employs the following means. Specifically, the present invention provides a digital device which has an operating system for executing in parallel a plurality of tasks each managed as one execution unit using program execution means. Here, the program execution means transmits information on an attribute of a function currently under execution to task attribute recognition means, and queries task execution determination means about execution of an abort to a task to which the function belongs. The task execution determination means, responsive to the query about the execution of the abort, determines whether or not the abort is executed based at least on the attribute of the function currently under execution. The task attribute recognition means stores the attribute of the function currently under execution in task attribute information storage means based on the information on the attribute of the function transmitted from the program execution means, and returns the attribute of the function stored in the task attribute information storage means in responsive to a query about the attribute of the function currently under execution from the task execution determination means.

In the foregoing configuration, as a task notifies the task attribute recognition means of the type of a function to be subsequently executed when the function is called or when the processing is returned, the task attribute information storage means always stores the type of the task currently under execution, thereby making it possible to reference and determine the information on the attribute of the function currently executed in the task. Therefore, a flexible control can be accomplished for the abortion in such a manner that when a predetermined function is being executed, the abortion is enabled even in an abort disabled section, whereas during the execution of another function which can cause a failure in the system, an associated task is prevented from being aborted.

In an alternative configuration, the information may be the name of the function currently under execution, wherein the task attribute recognition means determines the attribute of the function currently under execution based on the name.

In this configuration, some languages may have difficulties, due to their specifications, in determining an attribute of a function and notifying the task attribute recognition means of the attribute. Even in such a case, the attribute of the function currently under execution can be confirmed.

The task, which is one execution unit, may be a process or a thread.

Further, when the task attribute information storage means stores an attribute of a task itself instead of attributes of functions which constitute the task, the abort can be controlled based on the attribute of the task.

A program and a program recording medium are components for implementing functions of the respective means in a computer.

BRIEF DESCRIPTION OF THE DRAWINGS

FIG. 6 is a diagram showing an exemplary structure of functions in a task; and

DETAILED DESCRIPTION OF THE PREFERRED EMBODIMENTS

In the following, embodiments of the present invention will be described with reference to the accompanying drawings to promote understanding of the present invention. The following embodiments are mere examples in which the present invention is embodied and are not intended to limit the technical scope of the present invention.

[First Embodiment]

Figure 1:
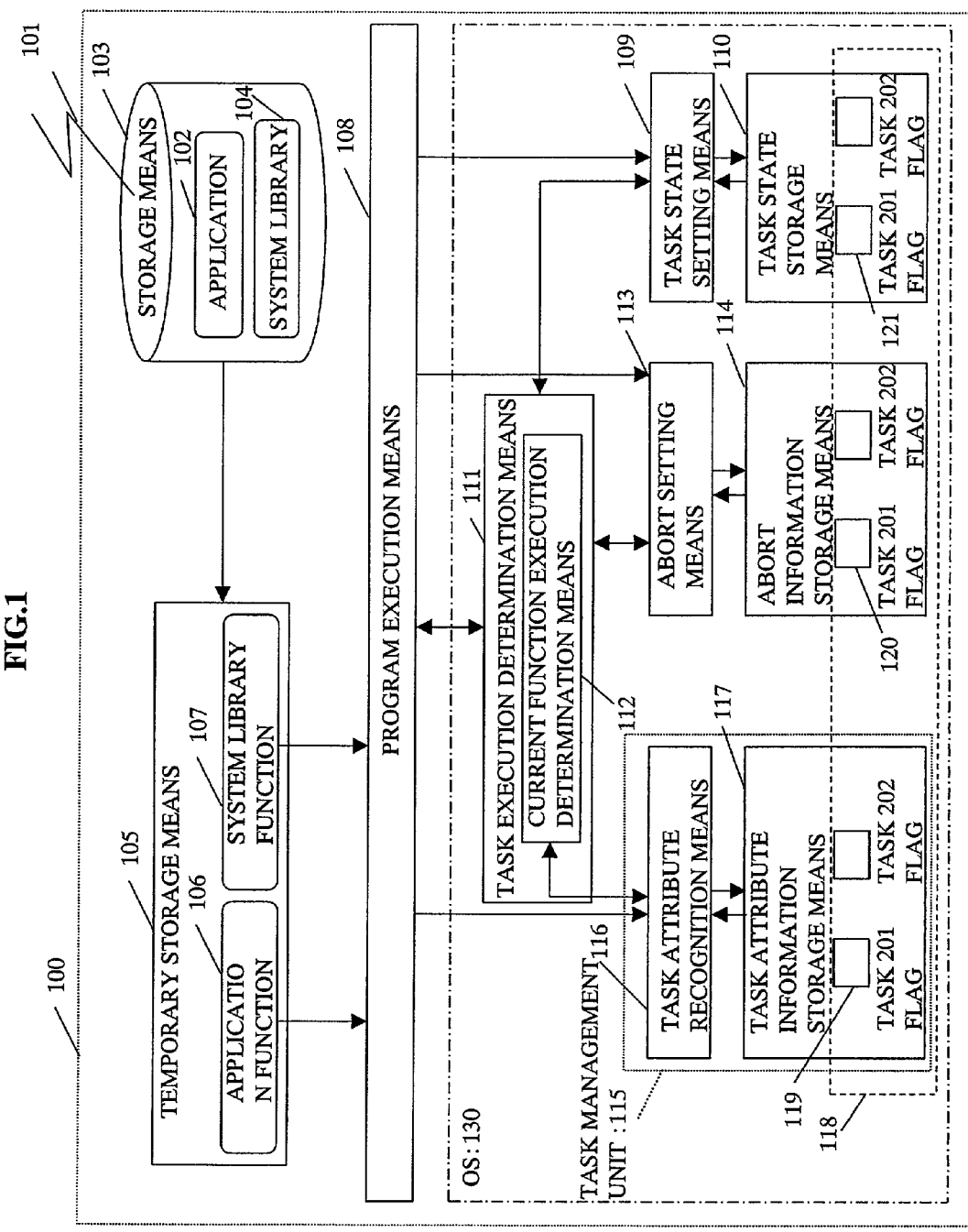
FIG. 1 is a functional block diagram schematically illustrating a digital device according to the present invention.

A digital device 100 according to a first embodiment of the present invention will be described with reference to FIGS. 1, 2 and 4. The digital device 100 may be, for example, a set-top box (STB), a portable telephone, a home-use electric device, a personal computer or the like which is capable of adding, changing and modifying a predetermined function by adding an application (program) from the outside.

First, the digital device 100 acquires a predetermined application (program 102) through a network 101, for example, the Internet or the like, and stores the application in a storage means 103. The application 102 may be, for example, a program described in an interpreter language for adding a new function to the digital device 100, and upon execution, generates a task 201 shown in FIG. 2 to execute the processing. The application 102 need not be acquired necessarily through the network 101, but may be provided through a storage medium such as a memory card.

Figure 4:
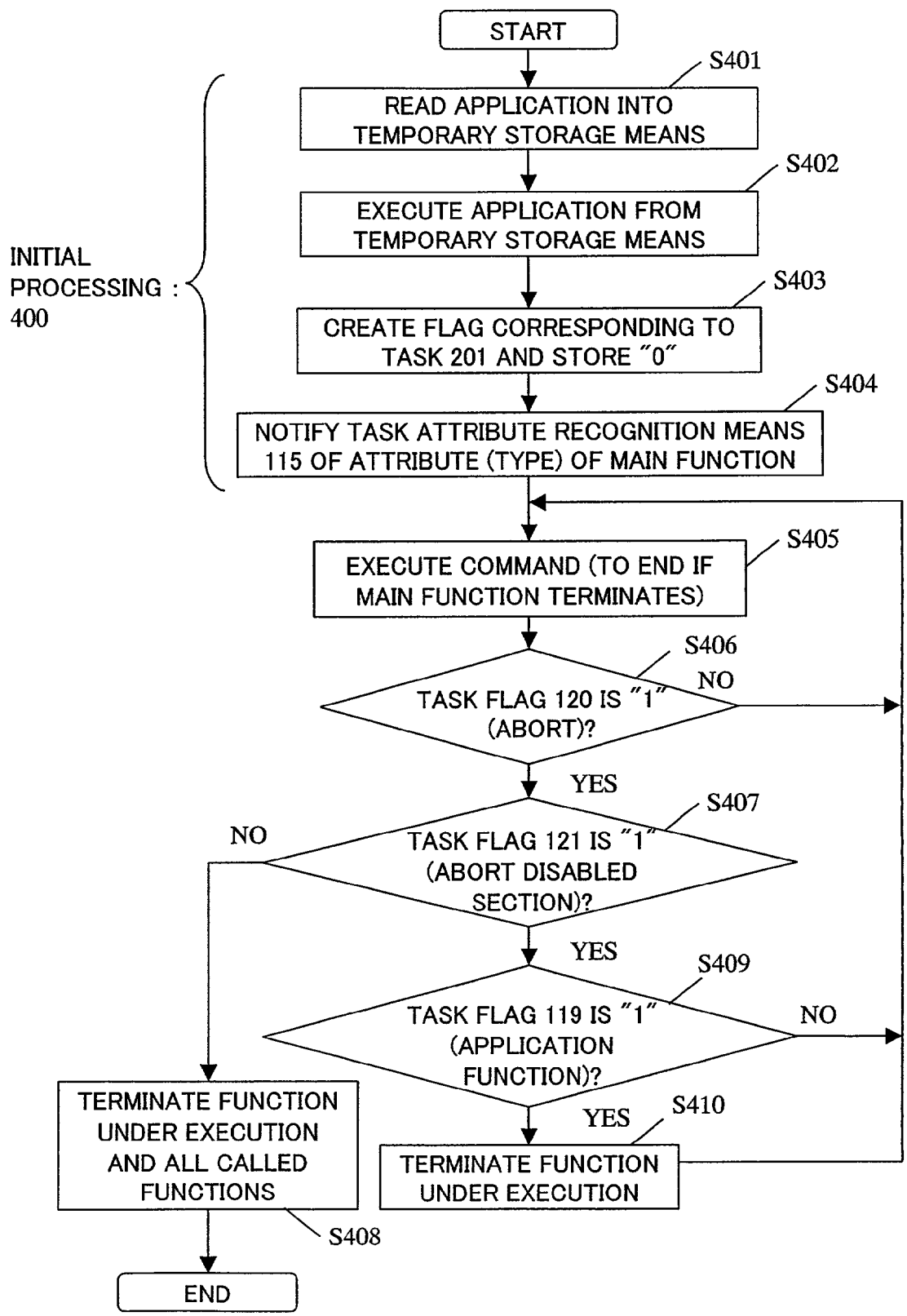
FIG. 4 is a flow chart illustrating a routine for processing an abort instruction during the execution of a task.
Figure 5A:
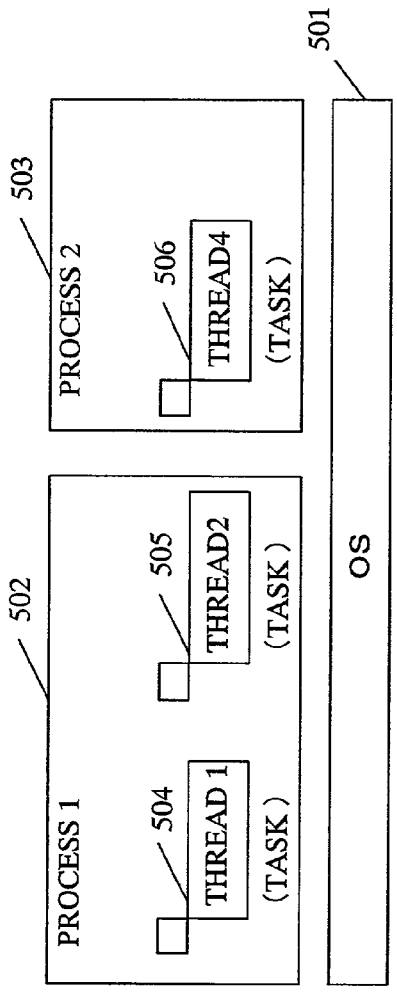
FIG. 5 is a diagram showing a concept of a process, a thread and an OS in the prior art.
Figure 5B:
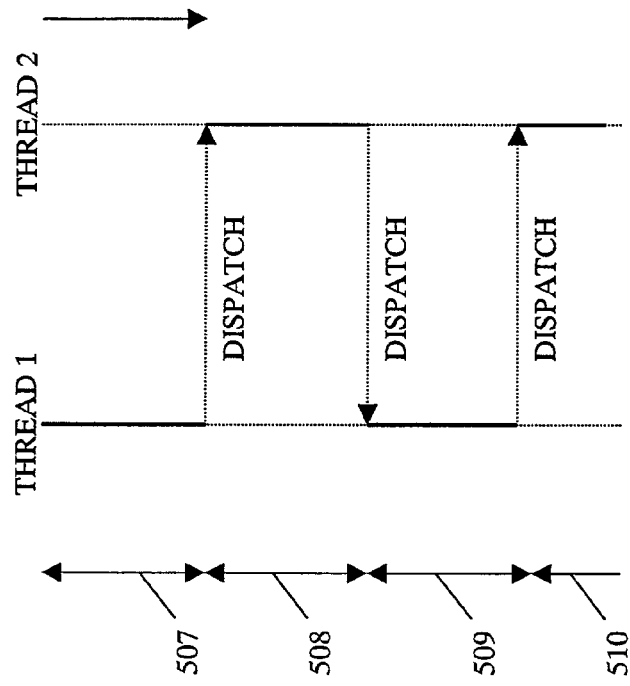
Figure 7:
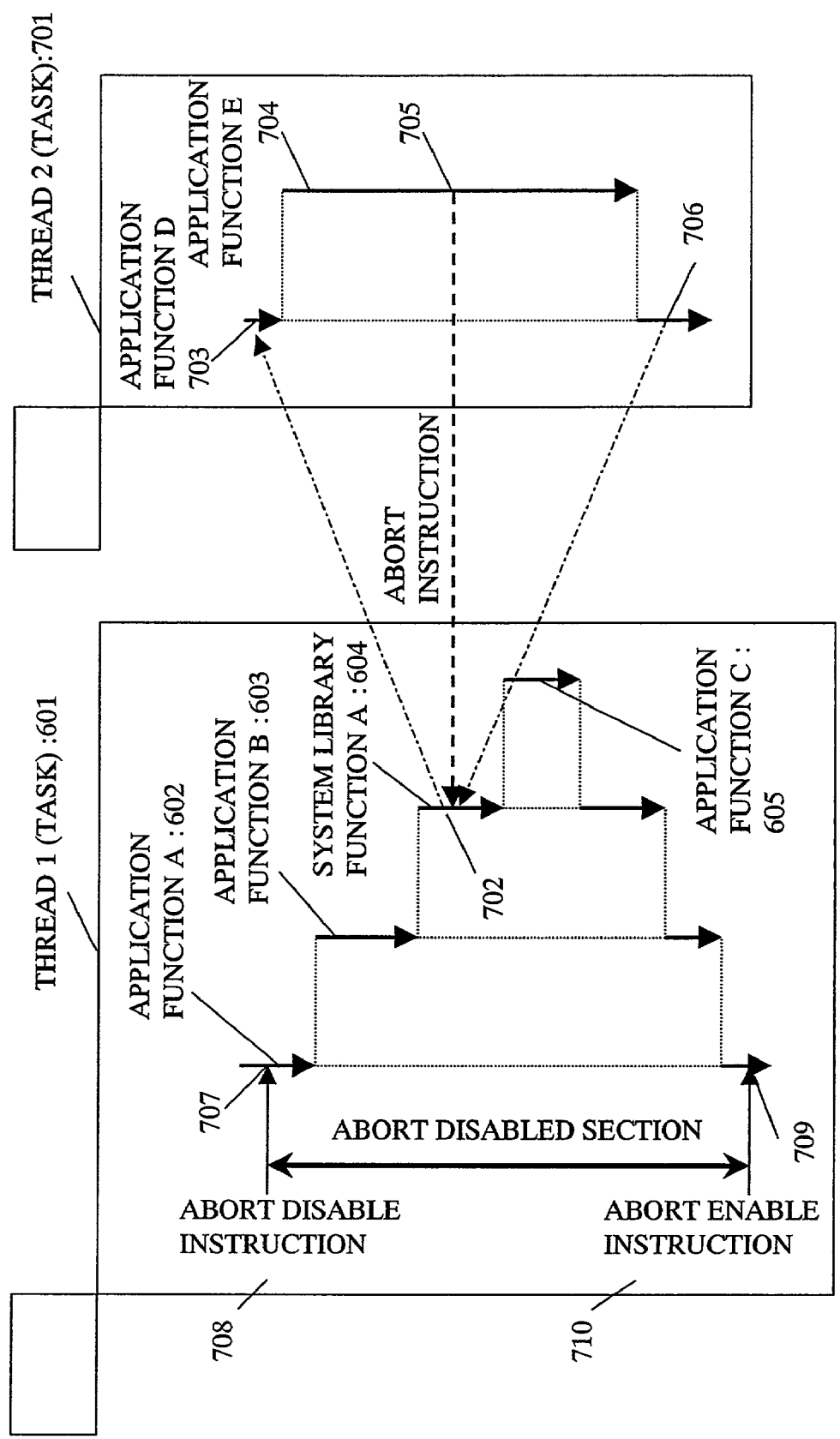
FIG. 7 is a conceptual diagram showing how an abort instruction is issued between tasks in the prior art.

Next, the application 102 is read into a temporary storage means 105 such as RAM (Random Access Memory) by a loader or the like upon execution (S401 in FIG. 4). As shown by a task 201 in FIG. 2, the application 102 is comprised of an application function a (203), an application function b (204) and an application function c (206). Further, the application 102 uses a system library function a(205),which is a system library function, upon execution. Therefore a system library function 107 is read into the temporary storage means 105 from a system library 104 stored in the storage means 103, for example, when the application 102 is read by the loader.

Subsequently, as the application function a (203), which is a main function of the application 102, is read into a program execution means 108, an OS 130 generates a task 201 corresponding to the application function a (203), and allocates resources to the task (S402 in FIG. 4). The application 102 is managed as the task 201 from now on.

Upon generation of the task, the OS 130 creates task flags 118 corresponding to the task 201 in a task state storage means 110, an abort information storage means 114, and a task attribute information storage means 117, later described, and stores, for example, "0" in the flag area (that means task flag="0") (S403 in FIG. 4). The program execution means 108, for example, notifies a task attribute recognition means 116 that a function currently executed in the task 201 is an application function (S404 in FIG. 4). Upon receipt of a notice indicating that the function currently executed by the task 201 is an application function, the task attribute recognition means 116 stores, for example, "1" in the task flag 118 corresponding to the task 201 in the task attribute information storage means 117, indicating that the application function is being executed. In this event, for example, if a task is created by an application provided by the OS, the main function is generally a system library function, so that "0" is stored in the task flag 118 corresponding to the task 201 in the task attribute information storage means 117.

Subsequently, the task 201 is executed sequentially from the first command of the application function a (203). Moreover, other functions such as the application function b (204) are read into the program execution means 108 as required. As one of the commands, for example, is executed, a task execution determination means 111 is queried whether an abort instruction has been transmitted to the task (here, the task 201). Details on the query will be described later.

The foregoing description has been made on the processing performed when a new application is executed (initial processing 400 in FIG. 4). For promoting the understanding, assume that the program execution means 108 also executes a task 202 which is comprised of an application function d (208) and an application function e (209).

Next, description will be made on details of the processing performed by a task state setting means 109 when a function currently executed in a task issues an abort instruction.

Assuming, for example, that an abort disable instruction 214 is transmitted from the task 201 to the OS 130 at a predetermined point 213 during the processing of the application function a (203), the abort disable instruction 214 is received by the task state setting means 109. Upon receipt of the abort disable instruction 214, the task state setting means 109 stores, for example, "1" in a flag area 121 corresponding to the task 201 in the task state storage means 110. "1" stored in the flag area 121 means that the task 201 now exists in an abort disabled section (the abortion is disabled).

When an abort enable instruction 216 is transmitted from the task 201 to the OS 130, for example, at a predetermined point 215 during the processing of the application function a (203), the abort enable instruction 216 is received by the task state setting means 109. Upon receipt of the abort enable instruction 216, the task state setting means 109 stores, for example, "0" in the flag area 121 corresponding to the task 201 in the task state storage means 110. "0" stored in the flag area 121 means that the currently executed task 201 does not exist in the abort disabled section (the abortion is not disabled).

In the foregoing manner, the task state storage means 110 always stores information as to whether the state of each task is abort disabled (flag "1") or abort enabled (flag "0"). Subsequently, as the task execution determination means 111, for example, queries about the contents of each task flag in the task state storage means 110, the task state setting means 109 reads a value stored in the task flag and returns the read value to the task execution determination means 111.

Next, description will be made on details of the processing performed by the task attribute recognition means 116 when a function executed in a task is changed.

When the application function a (203) calls, for example, the application function b (204) to switch the processing in the task 201 to the application function b (204), the task 201 notifies the task attribute recognition means 116 that a function currently executed in the task 201 is an application function. Here, the task attribute recognition means 116 stores "1" in a flag area 119 corresponding to the task 201.

When the application function b (204) calls the system library function a (205), the task 201 also notifies the task attribute recognition means 116 to that effect, in which case "0" is stored in the flag area 119 since the function executed in the task 201 is a system library function. Similarly to the foregoing, when the system library function a (205) calls the application function c (206), "1" is stored in the flag area 119.

When the processing of the application function c (206) terminates to return the processing to the system library function a (205), a flag "0" or "1" (here "0") corresponding to a subsequently executed function (a function after the processing is returned) is also stored in the flag area 119 in a similar manner to the time at which the function is called.

As the notifies the task attribute recognition means of the type of a function to be executed subsequently upon calling a function and upon returning the processing, the task attribute information storage means always stores the type of a task currently under execution. Subsequently, when the task execution determination means 111, for example, queries about the contents of each task flag in the task attribute information storage means 117, the task attribute recognition means 116 reads a value stored in the associated task flag, and returns the read value to the task execution determination means 111.

In the program execution means 108, the task 201 and task 202 are currently being executed, as described above.

Assume herein that the task 202 will issue an abort instruction 211 to the task 201. The time point (timing) at which the abort instruction 211 is issued depends on the time point at which the OS 130 switches the task, so that detailed processing at each time point will be described later. Here, description will be made on details of the processing performed by an abort setting means 113 when the abort instruction 211 is issued.

Figure 2:
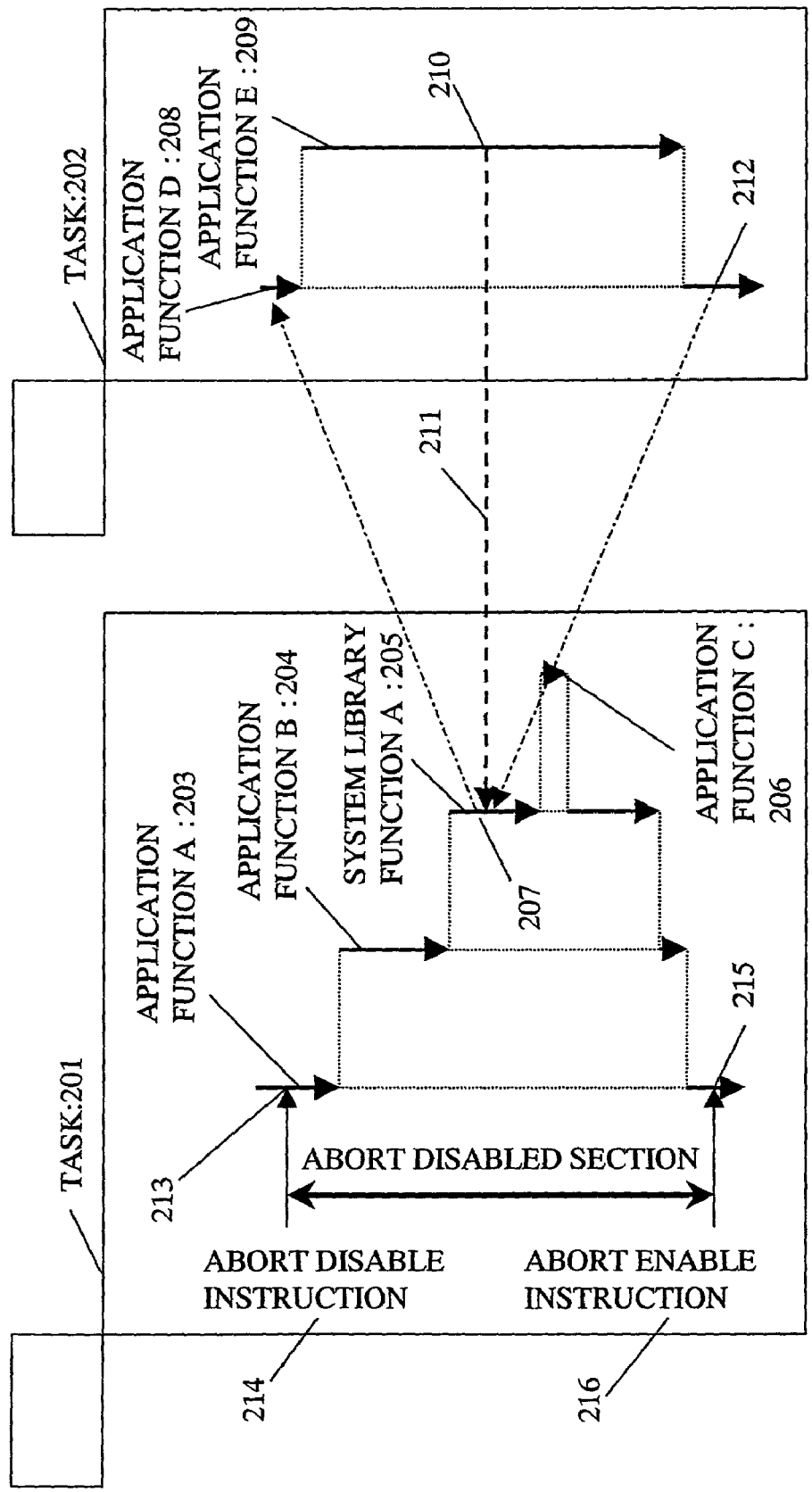
FIG. 2 is a conceptual diagram showing how an abort instruction is issued between tasks according to the present invention.

Assume first that the processing is switched from the task 201 to the task 202 at a predetermined point (for example, at a point 207 shown in FIG. 2). The switching of the tasks is identical to that described in connection with the prior art.

When the task 202 issues the abort instruction 211 to the task 201, specifically, the abort instruction 211 issued at a predetermined point 210, for example, by the application function e (209) called by the application function d (208) is received by the abort setting means 113. Upon receipt of the abort instruction 211, the abort setting means 113 stores "1" in a flag area 120 corresponding to the task 201 in the abort information storage means 114. "1" stored in the flag area 120 means that the task 201 corresponding to the flag area 120 has received the abort instruction. Subsequently, when the task execution determination means 111, for example, queries about the contents of each task flag in the abort information storage means 114, the abort setting means 113 reads a value stored in the associated task flag, and returns the read value to the task execution determination means 111.

In the foregoing manner, the abort instruction from another task, for example, is indicated by a flag of an associated task (a task which receives the abort instruction) in the abort information storage means 114 through the abort setting means 113.

The foregoing description has been made on the processing of the respective task state setting means 109, task attribute recognition means 116 and abort setting means 113.

Next, description will be made on details of the processing performed after a new application has been executed, in consideration of the aforementioned processing performed by the task state setting means 109, task attribute recognition means 116 and abort setting means 113.

After completing the initial processing 400 shown in FIG. 4, the program execution means 108 sequentially executes the first command in the application function a (203) of the task 201 (S405 in FIG. 4). Here, as one command, for example, is executed, the program execution means 108 queries the task execution determination means 111, which has been provided, for example, as a function of the OS 130, whether or not an abort instruction has been transmitted to the task (here, the task 201). Upon receipt of the query, the task execution determination means 111 queries the abort setting means 113 about the contents of the task 201 flag (120) in the abort information storage means 114. The contents of the task flag are as described above.

When the abort setting means 113 replies that the task 201 flag (120) is not "1," this indicates that no abort instruction is issued to the task 201, so that the task execution determination means 111 notifies the program execution means 108 to that effect, causing the program execution means 108 to execute the next command (No at S406→S405 in FIG. 4). If the next command is, for example, a command for calling the application function b (203), the task 201 flag (119) in the task attribute information storage means 117 is rewritten on occasion, as described above.

Conversely, when the abort setting means 113 replies that the task 201 flag (120) is "1," this indicates that an abort instruction has been issued to the task 201. The task execution determination means 111 further queries the task state setting means 109 about the contents of the task 201 flag (121) in the task state storage means 110 (Yes at S406→S407 in FIG. 4).

Here, when the task state setting means 109 replies that the task 201 flag (121) is not "1," this represents that the task 201 is not in an abort disabled section, i.e., the abortion of the task 201 will not affect the overall system (no shared resource is being manipulated). Therefore, as the task execution determination means 111 notifies the program execution means 108 to that effect, the program execution means 108 fully terminates a function under execution (for example, the application function c (206)) and a function which called the function (for example, the application function a (203), application function b (204), system library function a (205)), and terminates the task 201 (No at S407→>S408→End in FIG. 4).

Conversely, when the task state setting means 109 replies that the task 201 flag (121) is "1," this represents that the task 201 is in the abort disabled section, i.e., the abortion of the task 201 could affect the overall system (a shared resource is being manipulated, or the like). In this event, a current function execution determination means 112, which forms of the task execution determination means 111, queries the task attribute recognition means 116 about the contents of the task 201 flag (119) in the task attribute information storage means 117 (Yes at S407→S409 in FIG. 4).

Here, when the task attribute recognition means 116 replies that the task 201 flag (119) is not "1" ("0"), this means that the task 201 is currently executing a system library function, i.e., the abortion of the system library function could affect the overall system (a shared resource is being manipulated, or the like), so that the processing proceeds to the next command without aborting the execution of the system library function (No at S409→S405 in FIG. 4).

Conversely, when the task attribute recognition means 116 replies that the task 201 flag (119) is "1," this means that the task 201 is currently executing an application function. Since the abortion of the application function will not (hardly) affect the overall system, the function under execution is terminated (Yes at S409→S410 in FIG. 4). When the function under execution is a main function, the abortion of the main function can affect the overall system, so that the task 201 is terminated (S410→S405→End).

As described above, in this embodiment, in addition to the abort information (whether or not the abort information is received) stored in the abort information storage means, and a task state (whether or not a task is in an abort disabled section) stored in the task state storage means, attribute information on a function executed by a current task (whether it is an application function or a system library function) stored in the task ask attribute information storage means is referenced and determined. Therefore, a flexible control can be accomplished for the abortion in such a manner that when an application function is being executed, the abortion (interruption of the application function) is enabled even in the abort disabled section, while during the execution of a system library function which can cause a failure in the system, an associated task is prevented from being aborted.

Figure 3:
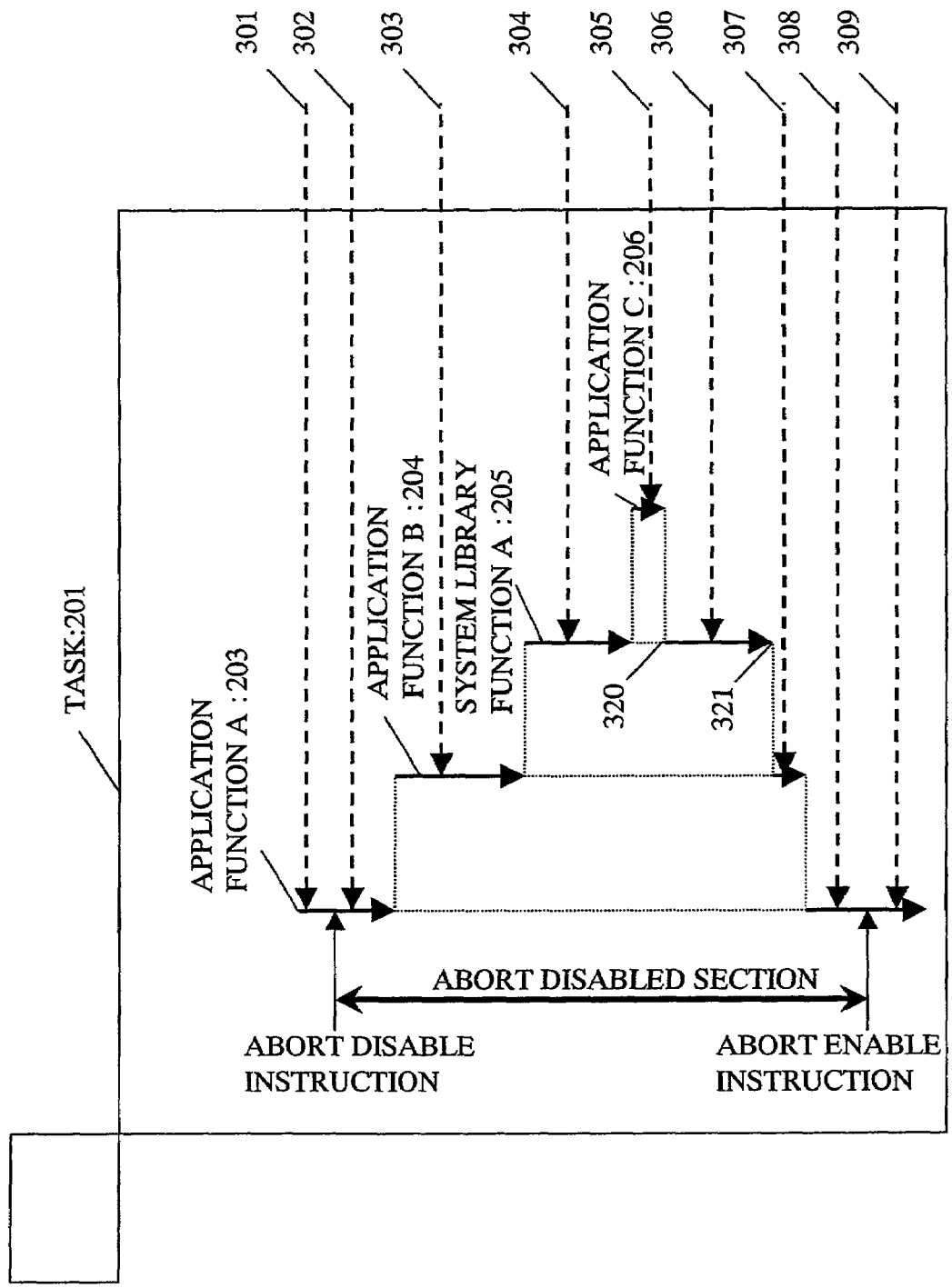
FIG. 3 is a diagram for showing a point at which an abort instruction is received during the execution of each function.

Next, description will be made on details of the processing which depends on a point at which an abort instruction is received, with reference to FIGS. 3, 4. It should be noted that each processing represents the flowchart of FIG. 4 divided into respective situations, but has the same contents as the foregoing flow chart.

First, when an abort instruction is received before or after setting an abort disabled section for the application function a (abort instruction 301 or 309), the application function a is terminated, i.e., the task 201 is terminated (No at S407→S408 in FIG. 4).

When an abort instruction is received after setting the abort disabled section during the execution of the application function a (abort instructions 302, 308), the application function a is terminated, i.e., the task 201 is terminated (Yes at S407→S409→S410→S405→End in FIG. 4).

When an abort instruction is received during the execution of the application function b (abort instructions 303, 307), the application function b is terminated to return the processing to the application function a. However, the application function a will also be immediately terminated, and therefore, the task 201 will be terminated (two repetitions of Yes at S407→Yes at S409→S410→S405, and to End in FIG. 4).

When an abort instruction is received during the execution of the system library function a (abort instruction 304, (including an abort instruction 306)), the application function c is called without terminating the execution of the system library function a. Here, since the application function c immediately terminates (in the case of an abort instruction 305, later described), the system library function a is executed again from a point 320 to a point 321, and the processing is returned to the application function b. Subsequently, the application function b and application function a immediately terminate, i.e., the task 201 terminates (Yes at S407→No at S409→S405 Yes at S406→Yes at S407→Yes at S409→S410 (termination of application function c)→S405→. . . →No at S409→S405 . . . (after termination of system library function a)→Yes at S409→S410 (termination of application function b)→S405→. . . →S410 (termination of application function a)→End in FIG. 4).

When an abort instruction is received during the execution of the application function c (abort instruction 305), the application function c is terminated, and the processing is returned to the point 320 of the system library function a. After the processing is executed to the point 321, the processing terminates immediately after the processing is returned to the application function b, application function a, i.e., the task 201 terminates (Yes at S407→Yes at S409 →S410 (termination of application function c)→S405→. . . →No at S409→S405→. . .→No at S409→S405 . . . (after termination of system library function a)→Yes at S409→S410 (termination of application function b)→S405→. . . →S410 (termination of application function a)→End in FIG. 4).

The foregoing description has been made on the processing in the first embodiment. While in the first embodiment, description has been made for the processing when the abort disabled section can be set, the determination of the abort disabled section is not always required. Specifically, determination as to whether or not the abortion can be made based only on attribute information on a currently executed function without determining whether or not the function is in the abort disabled section. In this case, the processing at S407 and S408 shown in FIG. 4 may be removed.

While an application function and a system library function have been given as examples of the attributes of function, the present invention is not necessarily limited to the two attributes. When functions can be classified into different types depending on a used language, information of attributes of such different functions maybe added as criteria for the determination.

[Second Embodiment]

Next, in a second embodiment, the processing for storing information in a task flag in the task attribute storage means will be described with reference to FIG. 1.

In the first embodiment, the attribute (application function or system library function) of a function currently executed by the program execution means 108 is notified directly to the task attribute recognition means 116 to store the attribute in each task flag in the task attribute information storage means 117.

In the second embodiment, when a function currently under execution is changed, the program execution means 108 transmits the name of a changed function (the name of a function to be executed) to the task attribute recognition means 116. Upon receipt of the function name, the task attribute recognition means 116 references the application function 106 and system library function 107 stored in the temporary storage means 105 to determine whether the associated function is an application function or a system library function. Upon determination of the attribute of the function, the task attribute recognition means 116 stores the type of the function in a task flag associated therewith.

In the foregoing manner, even when the attribute of a function cannot be transmitted directly from the program execution means to the task attribute recognition means 116, the task attribute information storage means can store the attribute of a function currently under execution in a task flag associated therewith.

In the foregoing first and second embodiments, the attribute of a function currently executed in a task is used as the basis for determining whether the abortion is executed. However, the basis for the determination is not necessarily limited to the attribute of the function. Specifically, in a multitask OS, some of functions provided by the OS can be executed as an independent task, which is referred to as a "system task" (a system process, a system thread and the like). On the other hand, a task initiated by the user is an application task (a user process, an application thread and the like).

The classification of tasks into the system task and application task can be based on task attributes, and from a comparison of the two task attributes, the following can be said.

The system task is highly reliable (secure) because it is provided as a function of the OS, while the application task can perform malicious processing and therefore is less reliable than the system task. Further, the system task, when aborted, is highly likely to cause a failure in the system, whereas the application task, even utilizing a system library function, will exert a limited influence within the application task when it is aborted.

Thus, in consideration of the foregoing, it can be said that the determination as to whether or not the abort instruction is accepted may be made based on the classification of attributes associated with tasks rather than attributes associated with functions. Specifically, the attribute of task is stored in the flag area (task flag) stored in the task attribute information storage means instead of the attribute of function. This storage processing may be performed only once by the program execution means for the task attribute recognition means in the initial processing when the task is initiated. The value to be stored is, for example, "0" for a system task and "1" for an application task. Subsequently, an associated task flag in the task attribute information storage means is checked in a similar manner.

In the foregoing manner, a flexible control can be accomplished for the abortion by managing the attribute of task instead of the attribute of function, and determining whether or not an abort instruction is executed for a task.

As described above, according to the present invention, as a task notifies the task attribute recognition means of the type of a function to be subsequently executed, when the function is called or when the processing is returned, the task attribute information storage means always stores the type of a task currently under execution. This permits reference to and determination of attribute information on a function executed in a current task, stored in the task attribute information storage means, thereby making it possible to achieve a flexible control for the abortion in such a manner that when a predetermined function is being executed, the abortion (interruption of the application function) is enabled even in the abort disabled section, whereas during execution of another function which can cause a failure in the system, an associated task is prevented from being aborted.

moreover, when the task attribute information storage means stores attributes of tasks instead of attributes of functions, the abortion can be controlled based on the attributes of tasks.

What is claimed is:

1. A task management device provided with a multitask operating system for executing as one execution unit a first task including application functions and a second task to abort the first task by program execution means, comprising:

task state setting means for setting that the first task now exists in an abort disabled section when a function currently executed in the first task issues an abort disable instruction;

task attribute information storage means for storing attribute information indicating that a function currently executed in the first task, whenever the function is changed, is a system library function or an application function predetermined by the operating system;

task execution determination means for determining whether or not the first task exists in the abortion disabled section when the first task received the abort disable instruction issued from the second task;

current function execution determination means for determining, based on the task attribute information storage means, the attribute information of the function currently executed in the first task, when it is determined that the state of the first task exists in the abort disabled section; and the program execution means for aborting the first task when the attribute information of the first task is the application function, and continuing the first task when the attribute information of the first task is the system library function.

2. The task management device according to claim 1, wherein task attribute recognition means comprising the current function execution determination means determines the attribute of the current-executing function based on a name of the current-executing function.

3. The task management device according to claim 1, wherein said task managed as one execution unit is a process.

4. The task management device according to claim 1, wherein said task managed as one execution unit is a thread.

5. A task management method for use in a multitask operating system for executing as one execution unit a first task including application functions and a second task to abort the first task, comprising the steps of:

setting that the first task now exists in an abort disabled section when a function currently executed in the first task issues an abort disable instruction;

storing attribute information indicating that a function currently executed in the first task, whenever the function is changed, is a system library function or an application function predetermined by the operating system;

determining whether or not the first task exists in the abortion disabled section when the first task received the abort disable instruction issued from the second task;

determining the attribute information of the function currently executed in the first task, when it is determined that the state of the first task exists in the abort disabled section; and aborting the first task when the attribute information of the first task is the application function, and continuing the first task when the attribute information of the first task is the system library function.

6. A computer readable recording medium having recorded thereon a program for causing a computer which executes as one execution unit a first task including application functions and a second task to abort the first task, using a program execution function, to perform the steps of:

setting that the first task now exists in an abort disabled section when a function currently executed in the first task issues an abort disable instruction;

storing attribute information indicating that a function currently executed in the first task, whenever the function is changed, is a system library function or an application function predetermined by the operating system;

determining whether or not the first task exists in the abortion disabled section when the first task received the abort disable instruction issued from the second task;

determining the attribute information of the function currently executed in the first task, when it is determined that the state of the first task exists in the abort disabled section; and aborting the first task when the attribute information of the first task is the application function, and continuing the first task when the attribute information of the first task is the system library function.

* * * * *

UNITED STATES PATENT AND TRADEMARK OFFICE
CERTIFICATE OF CORRECTION

| | | |
|---|---|---|
| PATENT NO. | : 7,191,443 B2 | Page 1 of 1 |
| APPLICATION NO. | : 10/050988 | |
| DATED | : March 13, 2007 | |
| INVENTOR(S) | : Yuko Kubooka et al. | |

It is certified that error appears in the above-identified patent and that said Letters Patent is hereby corrected as shown below:

On the title page of the Letters Patent,

Under section "(75) Assignee" change "Yuko KUBOOKA" to -- Yuko IMANISHI --

Signed and Sealed this

Twenty-ninth Day of April, 2008

JON W. DUDAS
*Director of the United States Patent and Trademark Office*